July 3, 1951     I. T. ERICKSON     2,559,414
ICE CUBE FREEZER

Filed June 6, 1949     4 Sheets-Sheet 1

INVENTOR.
Irving T. Erickson
BY Buckhorn and Cheatham
Attorneys

INVENTOR.
Irving T. Erickson
BY Buckhorn and Cheatham
Attorneys

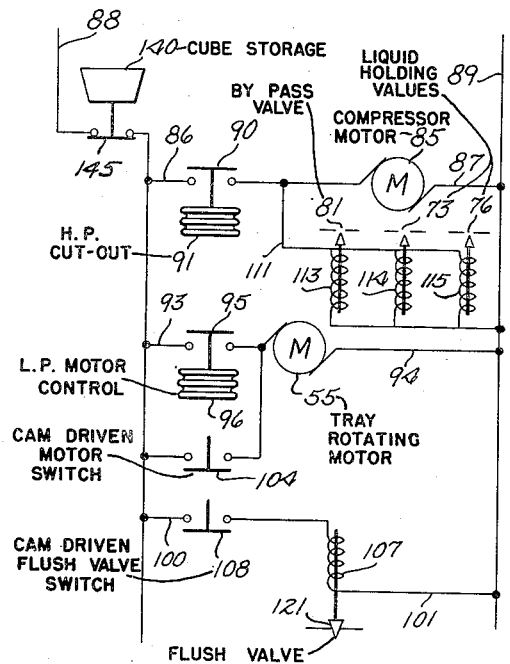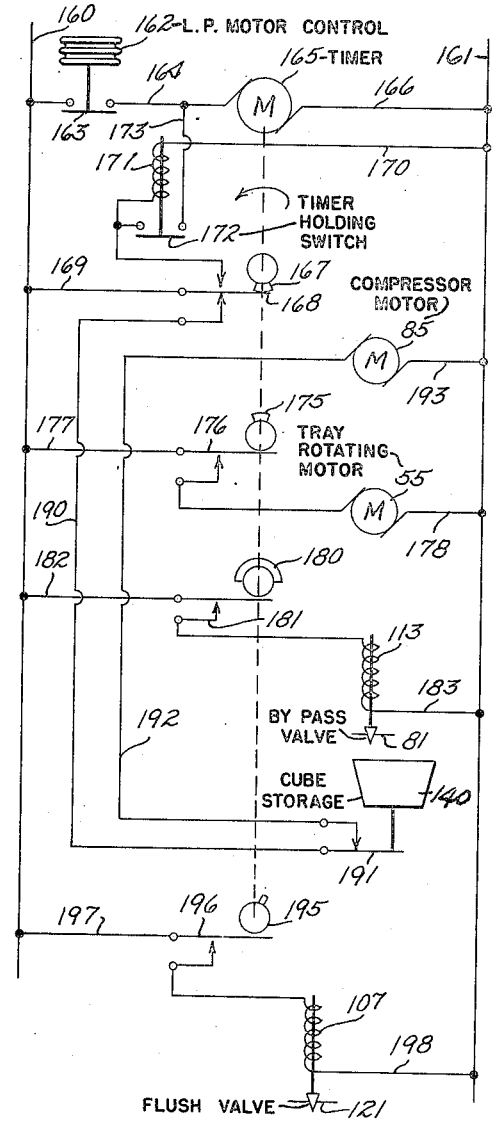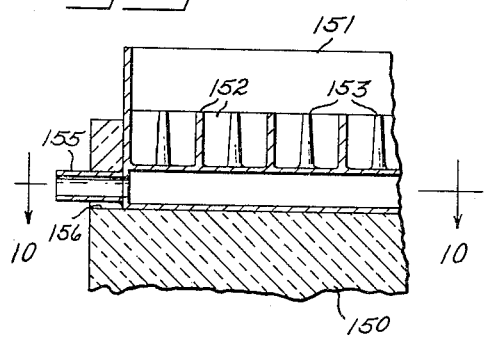

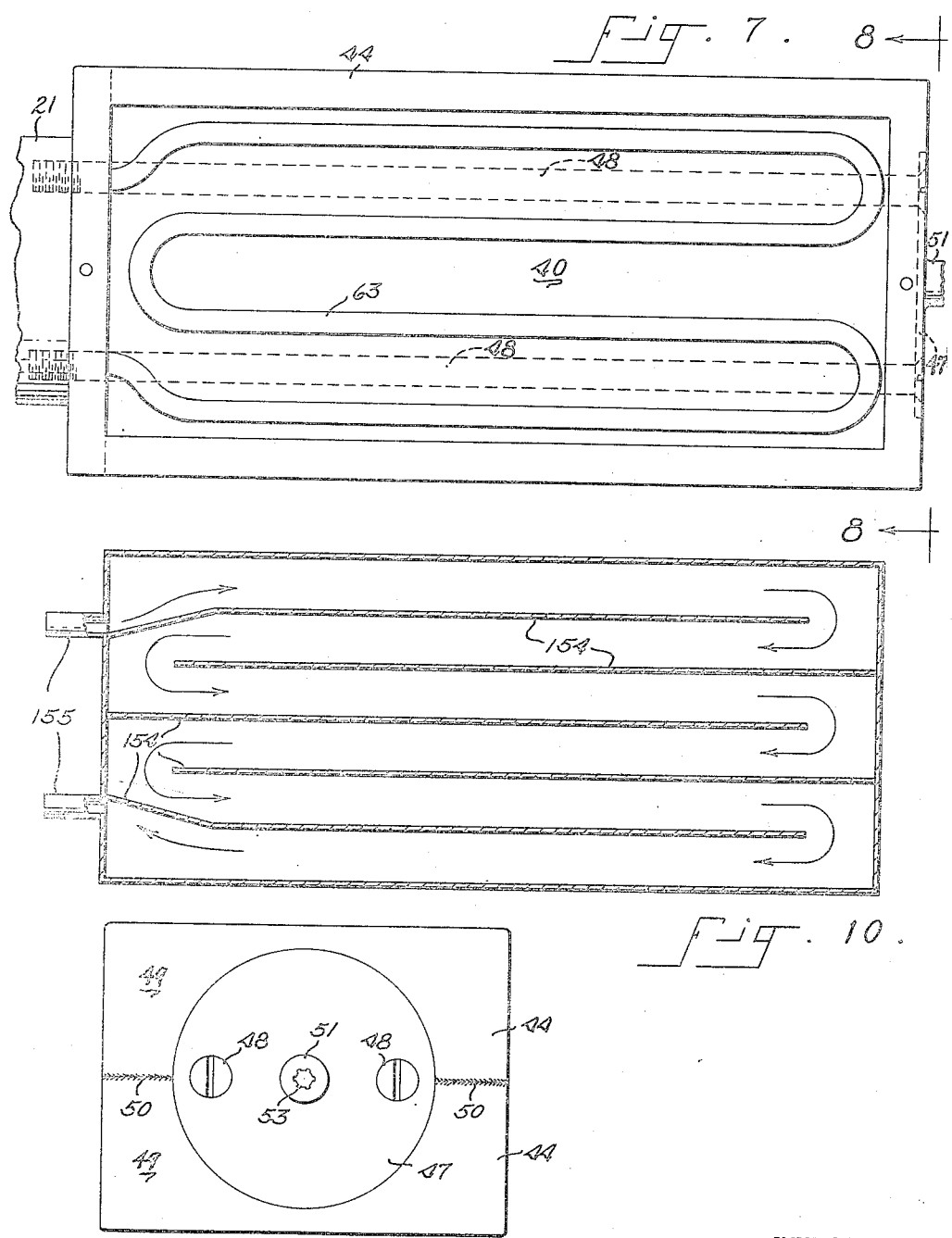

Patented July 3, 1951

2,559,414

UNITED STATES PATENT OFFICE 2,559,414

ICE-CUBE FREEZER

Irving T. Erickson, Portland, Oreg.

Application June 6, 1949, Serial No. 97,383

16 Claims. (Cl. 62—4)

My present invention comprises an automatic, continuously operating ice-cube machine. The primary purpose of the present invention is to provide a continuous supply of ice cubes for use in hotels or other establishments where large quantities are needed from time to time. A further purpose of the present invention is to provide a machine for creating small frozen comestibles such as ice cream, sherbet, or the like, whereby an establishment dealing in such products may make its own supply of frozen delicacies. As used herein the term "ice cube" refers not only to frozen water but to frozen substances of any type provided for human consumption. The present invention has the advantage over prior art devices of being easily manufactured and assembled and of requiring no attention during the operation thereof. It is contemplated that the present invention may be of greatest utility in connection with compressors of relatively small capacity, such as one-fourth to one horsepower, but it is to be appreciated that larger installations may be made if desired. By the use of such a machine as my invention the dependence of establishments upon central ice-cube plants is eliminated.

One object of the present invention is to provide a machine of the foregoing character which is automatically operated in response to the pressures of a refrigerant system employing a volatile refrigerant such as dichlorodifluoromethane, which is nontoxic, nonexplosive, odorless, tasteless, and operates at relatively low pressures.

A principal feature of the present invention is in the provision of means whereby cubes formed in a freezing receptacle are automatically released from the receptacle by the heat of the hot compressed gas from the compressor.

The objects and advantages of the present invention will be more readily apparent by reference to the following specification taken together with the accompanying drawings wherein certain details of the invention are illustrated in their preferred form and other details are illustrated in schematic form in sufficient detail to enable one skilled in the art to practice the invention.

In the drawings,

Fig. 5 is a schematic representation of a control circuit for the machine;

Fig. 7 is a plan view of the receptacle mounting mechanism prior to the attachment of a receptacle thereto, the view being taken from the plane of the line 7—7 in Fig. 1;

Fig. 8 is an end view of the receptacle mounting means prior to the attachment of the receptacle thereto, taken substantially from the plane of the line 8—8 in Fig. 7;

Fig. 9 is a fragmentary section of a modified form of freezing receptacle;

Fig. 10 is a horizontal section taken substantially along line 10—10 of Fig. 9; and Fig. 11 is a modified form of control circuit for the machine.

Figures 1, 2, 3:
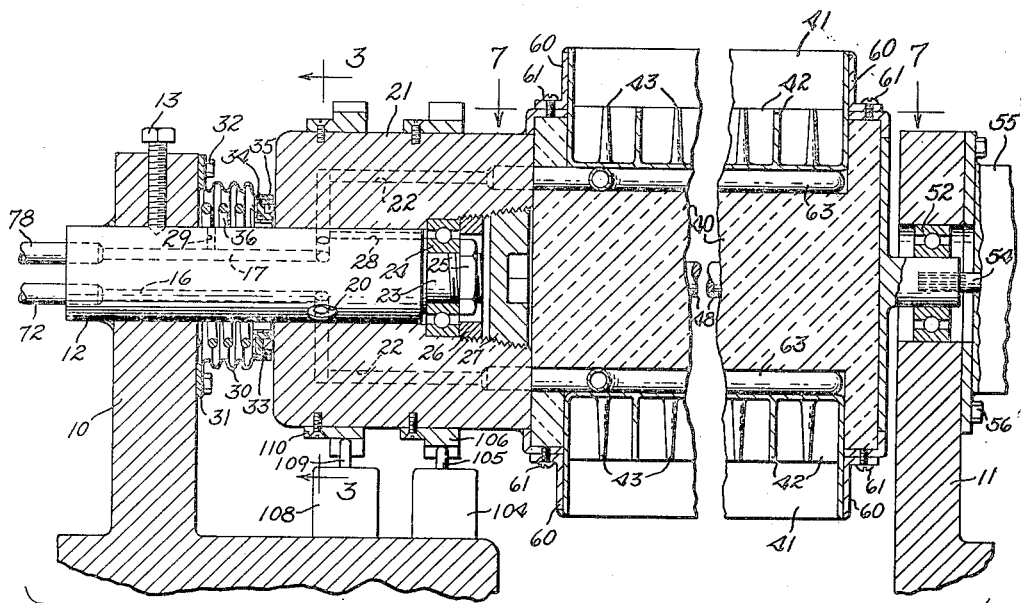
Fig. 1 is a vertical section through the essential features of the invention taken substantially along line 1—1 of Fig. 2, with parts of the machine broken away.
Fig. 2 is an end view looking at the left end of Fig. 1.
Fig. 3 is a vertical section taken substantially along line 3—3 of Fig. 1.

In accordance with the invention as illustrated in Figs. 1-8 inclusive, I provide a frame including a pair of upright supports 10 and 11. The support 10 is provided with a lateral opening in which is fixedly mounted a horizontal trunnion 12, the outer end of the trunnion projecting from the support and being welded thereto around its periphery to provide a gas-tight seal. The trunnion is fixed in its position by a set screw 13 or equivalent means. The trunnion is provided with a plurality of longitudinally drilled passages comprising a discharge passage 15, a condenser inlet passage 16, an expansion passage 17 and a suction passage 18. The inner ends of the passages are directed laterally to the surface of the trunnion member, and the compressor discharge passage 15 and condenser inlet passage 16 open into enlargements 20 in the trunnion surface.

The trunnion 12 supports a large, rotatable member 21 having four passages 22 therethrough, each of which is directed laterally, then longitudinally, of the rotatable member. The communicating ends of the passages through the trunnion and the passages 22 are equally spaced about the center of the trunnion so that each passage 22 may communicate with one of the passages 15 to 18 inclusive at four ninety-degree positions as the rotatable member 21 rotates about the trunnion 12. The trunnion 12 is provided with a threaded, reduced end 23 upon which is mounted the inner raceway of a ball-bearing assembly 24, the inner raceway being held against a shoulder of the trunnion by a nut 25. The outer raceway is held against a shoulder in a coaxial recess in the rotatable member by an externally threaded ring nut 26. Since the rotatable member must have some clearance to rotate about the trunnion, a gas seal is provided at the inner end of the rotatable member by an enlarged plug 27 sealing the cavity in which the bearing assembly is mounted. The parts are accurately machined with close tolerances so that very little gas will escape between the trunnion and the rotatable member, and in order that what gas might escape may be returned to the compressor pressure release passages 28 and 29 are drilled through the trunnion into the suction passage 18. A complete gas seal is provided by a metallic bellows 30 having one end directed outwardly and sealed against the support 10 by a ring 31 to which it is soldered, and a plurality of studs 32. The other end of the bellows is soldered to a ring retainer 33 in which is mounted a resilient member 34, formed of neoprene or equivalent substance, in which is retained a hardened sealing ring 35 adapted to bear against a machined surface of the rotatable member. The ring is thrust against the rotatable member by an enclosed spring 36. The contacting surfaces of the trunnion and the rotatable member, and of the sealing ring 35 and the rotatable member, are lubricated by the 20 to 30 per cent of the compressor lubricant which is carried with the refrigerant. Since the rotatable member operates at relatively slow speeds and intermittently, sufficient lubrication will be provided thereby in an assembly of the nature described.

The rotatable member 21 provides a support for an insulating member 40, the same being preferably formed of ceramic in the shape of an elongated block having a pair of oppositely disposed cavities therein of sufficient size to receive oppositely directed receptacles 41, each of which is provided with a plurality of partitions 42 subdividing the receptacle into cubical compartments. The partitions are preferably provided with small notches 57 in their upper edges so that water will completely fill the tray without standing above the partitions. In each of the compartments there is preferably provided a centrally disposed, tapered upright 43 which forms a passage through the ice cube formed in the compartment so that the resulting cubes will be perforated. The perforations are provided to prevent the ice cubes from freezing to each other, as is the case with solid ice cubes, when they are dumped loosely into a large storage space. The outer wall of each receptacle is preferably relatively high with respect to the partitions 42 so that water may be rapidly dumped thereinto without running over the side walls.

The ceramic body 40 is strengthened, preferably by means of a pair of flanged shells 44 having their matching edges at one end provided with semicircular notches to receive the end of the rotatable member 21, and the remaining portions thereof being soldered together as indicated at 45. The opposite end of the ceramic body 40 engages a circular plate 47 which is centered with respect to the trunnion 12 by means of a pair of long studs 48 which pass through openings in the ceramic body 40 and are screwed into the end face of the rotatable member 21. The shells 44 have flanges 49 surrounding the member 47, the contacting edge portions of the flanges being soldered together at 50.

A central trunnion 51 projects from the plate 47 and is received in a ball-bearing assembly 52 mounted in the end support 11. The trunnion 51 is provided with a splined central opening 53 in which is received the driven shaft 54 of a reduction gear motor 55, the motor being mounted on the support 11 by studs 56. It will be appreciated that there is very little weight and only slight torque, since the rotating assembly is relatively small and the rotation thereof is relatively slow, so that large tolerances at the driven end of the rotating assembly are permissible.

The receptacles 41 are mounted upon the rotating assembly by means of end brackets 60 which are soldered to the ends of the receptacles, the brackets being fastened to the flanges of the members 44 and 49 by screws 61. The arrangement is such that a small space is provided between the ceramic body 40 and the adjacent bottom wall of each receptacle 41. This space is occupied by a serpentine coil 63 held in intimate contact with the bottom of the receptacle, the ends of the serpentine coil being soldered into enlargements of the passages 22.

Figure 4:
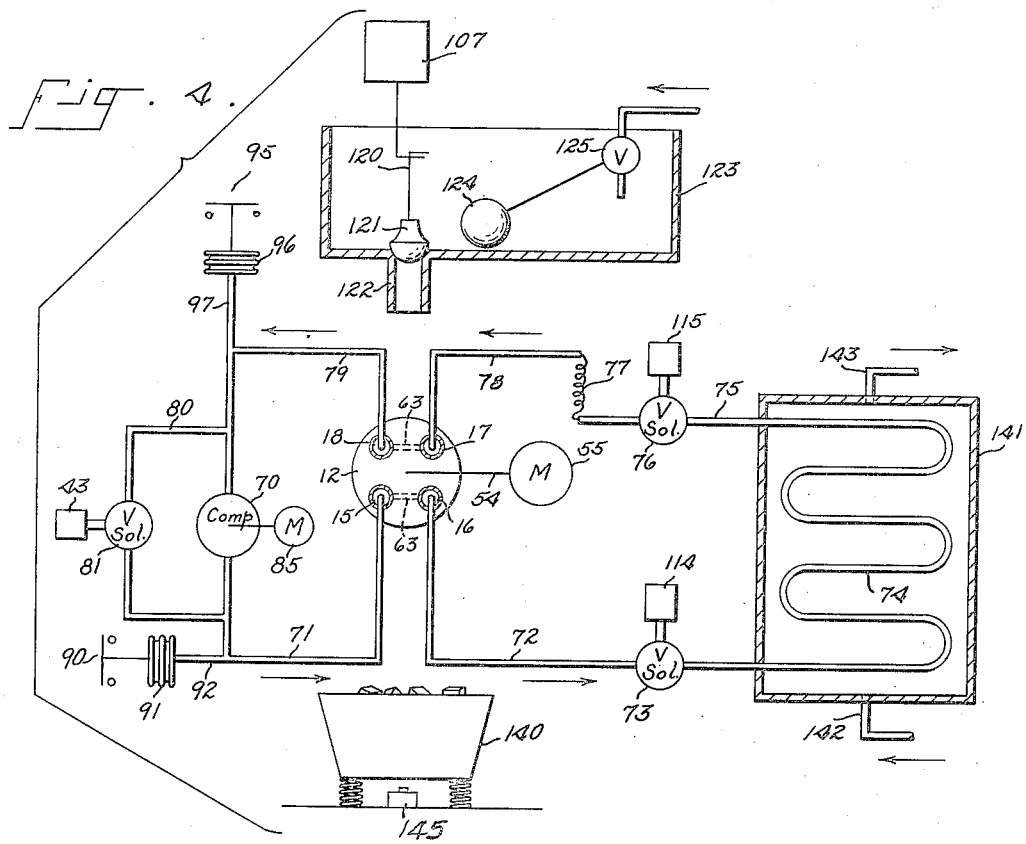
Fig. 4 is a schematic representation of the refrigeration system.
Figure 6:
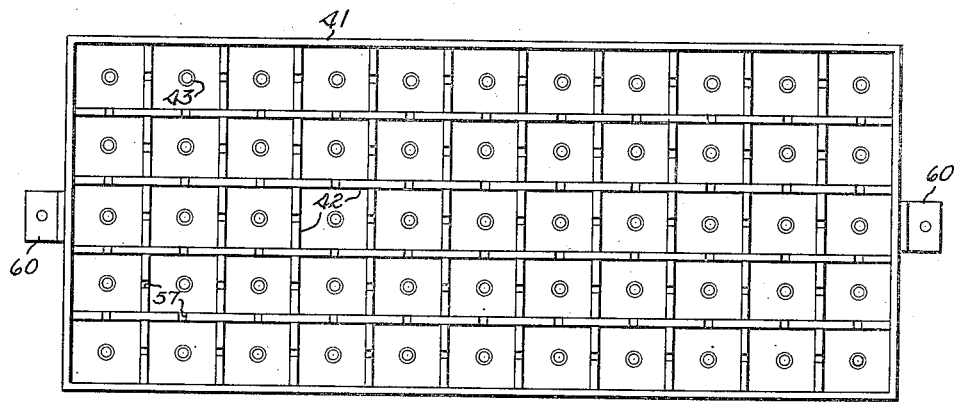
Fig. 6 is a plan view of one of the ice-tube receptacles.

Referring to Fig. 4, there is schematically indicated the refrigerant circuit, the same comprising a compressor 70 discharging hot, compressed gas into a discharge line 71, the discharge line being soldered into an enlargement of the end of passage 15. A condenser inlet line 72 is soldered into the end of the condenser inlet passage 16 which is at the same level as the condenser discharge passage 15. A solenoid valve 73 is provided in the line 72 for a purpose to be explained. The line 72 connects to a condenser coil 74 from which a liquid line 75 leads to a solenoid valve 76. A capillary tube 77 or equivalent orifice means connects the line 75 to a short tube 78 which is soldered into the end of the expansion passage 17. A suction line 79 is soldered into the end of the suction passage 18 and leads back to the compressor 70. A by-pass line 80 leads from the suction line 79 around the compressor to the discharge line 71, and a solenoid by-pass or unloader valve 81 is provided in the by-pass line.

In order to rotate the rotatable member when the cubes in one receptacle have been formed and to control the compressor accordingly, a control circuit is provided as illustrated in Fig. 5, with certain details being indicated in Figs. 1 and 2. The compressor 70 is driven by a motor 85 which receives current through lines 86 and 87 connected to supply lines 88 and 89, there being a high-pressure cut-out switch 90 controlling lines 86 and 87, the switch being operated by a bellows 91 into which high-pressure gas may be admitted through a branch 92 of the compressor discharge line 71. The motor continuously operates the compressor unless the discharge pressure exceeds a predetermined amount such as would be occasioned by blocking the discharge line. Lines 93 and 94 are connected to the main lines 88 and 89 through a low-pressure actuated switch 95 controlled by a bellows 96 which communicates with the suction line 79 through a branch 97. When switch 95 is closed due to the collapse of bellows 96 the motor 55 will operate. A by-pass leads to motor 55 through a mechanically actuated switch 104 which is operated by a plunger 105 engaging a cam ring 106 mounted on the rotatable member 21. If the plunger 105 is depressed, switch 104 will be closed so as to energize motor 55 regardless of the position of the low-pressure switch 95. Lines 100 and 101 lead to a flush valve solenoid 107 controlled by a switch 108 operated by a plunger 109 engaging a second cam ring 110 mounted on rotatable member 21. When the plunger 109 rises the solenoid 107 will be energized.

A line 111 leads from line 86 to a plurality of solenoid valve actuators 113, 114 and 115 connected in parallel with the motor 85 so as to be activated when the motor is energized and de-energized when the motor is de-energized Solenoid valve actuator 113 operates to open the by-pass valve 81 when the compressor stops so as to connect the discharge line 71 to the suction line 79 and thus balance pressures on both sides of the compressor; solenoid valve actuator 114 operates to close solenoid valve 73 when the compressor stops; and solenoid valve actuator 115 operates to close solenoid valve 76 when the compressor stops. The valves 73 and 76 isolate the condenser coil and most of the liquid line 75 so that when the compressor stops the main charge of liquid refrigerant will be held in readiness to commence expansion work as soon as the valves are opened.

The flush valve solenoid 107 is connected through a loose connection to the stem 120 of a flush valve float ball 121 controlling the outlet 122 of a water tank 123 which is situated above the receptacles so as to discharge a measured quantity of water thereinto when the solenoid 107 is actuated. The float ball 121 will rise and remain in its upper position until the tank is emptied even though the solenoid 107 should be de-energized before the tank is emptied. As soon as the water in the tank reaches a predetermined low level the suction through the outlet 122 will seat the float ball in the usual manner of such devices. A float valve actuator 124 is provided to open a water inlet valve 125 in the usual manner of such devices so that the tank 123 will be filled to a predetermined level between successive operations of the solenoid 107. Such devices are well known, being represented by the usual flush toilet empting and filling mechanisms, and include adjustment means whereby the amount of water retained and discharged at each operation may be accurately controlled.

As will be seen more clearly in Fig. 2, the cam 106 which operates switch 104 is provided with a pair of diametrically opposed, vertical faces 130 followed by low areas 131 of several degrees extent so that the switch 104 will be held closed for most of a half-revolution of the rotatable member 21 and will suddenly be opened at a desired point so that each operation of the motor 55 will be limited to 180 degrees. The low areas 131 cause the switch 104 to remain open for a few degrees at the start of each movement, and then the switch 104 will be closed. The cam 110 which controls the float valve solenoid is of maximum diameter for most of its extent, being provided with diametrically opposed, vertical faces 132 which are a few degrees ahead of the vertical faces 130 so that the solenoid 107 will be energized shortly before the motor 55 stops. The low areas 133 succeeding the vertical faces 132 are of short duration and so arranged as to open the switch 108 as the motor comes to rest. The two cams are so arranged as to provide the following sequence of operation: Motor 55 drives the rotatable member for most of a semi-revolution, whereupon the switch 108 is closed to open the flush valve shortly before the termination of the semi-revolution, and is then opened as the semi-revolution terminates. The actuation of the flush valve is so close to the end of the semi-revolution that one of the receptacles 41 will be nearly level and will retain the water discharged from the tank.

From the foregoing description of the low areas 131 of cam 106 it will be seen that the switch 104 will be open when motor 55 stops and cannot be mechanically closed until a few degrees of the succeeding semi-revolution has been achieved. The motor 55, therefore, cannot be energized unless provided with current through other means. Such other means comprise the low-pressure switch 95 which is closed when the bellows 96 collapses upon the pressure in suction line 79 reaching such a predetermined low pressure as to indicate that the cubes in the uppermost receptacle have been frozen. The bellows 96 will be held in such collapsed condition until the switch 104 is mechanically closed to complete the semi-revolution of motor 55.

In order to prevent the opening of the low-pressure switch 95 until the mechanical switch 104 has been closed, the refrigeration circuit to the condenser coil 74 is maintained open by the provision of the enlargements 20 in the ends of the discharge passage 15 and condenser inlet passage 16. As soon as the passages 22 in communication with enlargements 20 have passed beyond their confines, the pressure in the discharge line 71 will rise beyond a predetermined limit to expand the high-pressure bellows 91 and open switch 90 so that the compressor motor 85 is arrested. Simultaneously, by-pass solenoid 113 is de-energized to open the by-pass valve 81 so that the pressure in discharge line 71 is released and balances the pressure in suction line 79. This assures the expansion of the low-pressure bellows 96 so as to place control of the motor 55 entirely under the mechanical switch 104. The drop in pressure may close the high-pressure switch 90 but the motor 85 cannot continue in operation for long since the discharge passage 15 is blocked and the compressor will immediately stop. Whenever the by-pass valve 81 is open the isolating valves 73 and 76 are closed to retain the liquid refrigerant in the condenser coil 74.

When the rotatable member has made a quarter of a revolution, the coils 63 will be momentarily in communication with passages through the trunnion 12. The coil associated with the upper receptacle will be in communication with passages 15 and 18, and the coil associated with the lower receptacle will be in communication with passages 16 and 17. The coil communicating with passages 16 and 17 is filled with hot, high-pressure gas so none can enter from the condenser inlet line 72 except to the slight extent required to charge the short tube 78. At the same instant, the coil associated with the upper receptacle will be connected across the compressor discharge line 71 and the compressor suction line 79, the pressures therein having been previously balanced by the opening of the by-pass valve 81 so that no effect on the system will occur by reason of this positioning of the upper coil. Rotation will now continue until the semi-revolution is completed.

When the semi-revolution is completed the upper coil will operate as an expansion coil and will commence the work of freezing water which has been discharged into the upper receptacle. The lower coil now provides a passageway from the compressor to the condenser so that the hot compressed gas soon melts the cubes loose from the lower receptacle, whereupon they fall into a removable receptacle 140 or other means for conveying ice cubes away from the machine. The receptacle 140 is preferably mounted upon springs so that when filled to a certain capacity it will open a main switch 145 in power line 88 so as to prevent further operation of the system. If a receptacle is used it should be of sufficient capacity to hold ice cubes produced during a number of successive operations of the freezing unit.

Any suitable condenser may be employed, but I prefer a counter-flow, water cooled condenser comprising a shell 141 in which the coil 74 is located, the shell being provided with cold water through an inlet 142 at the bottom where the cool liquid refrigerant is located in the coil, and an upper outlet 143, thereby taking advantage of the counter-flow principle of refrigerant condensing. Suitable means, as is well known in the art, may be employed to control the water supply to the condenser.

A modification of the freezing receptacle is illustrated in Figs. 9 and 10, the modification having for its purpose the provision of a greater area of metal comprising the bottom of the water-holding compartments in contact with the refrigerant gas. In this modification a modified form of insulating block 150 is provided with cavities in which the freezing trays 151 are located, the freezing trays being provided with partitions 152 and central projections 153 as previously described. The bottom of the tray 151 forms the upper wall of a plate expander, so that the entire area thereof is in contact with the refrigerant gas. The plate expander is provided with a sinuous passageway by means of partitions 154 extending from alternate ends thereof as is usual in such devices. A pair of short, tubular connectors 155 provide the inlet and outlet to the plate expander, the same projecting through open slots 156 in the end of the rim of the block 150 and being connected to the passageways through the rotatable member 21.

A modified form of control circuit is illustrated in Fig. 11, this control circuit eliminating some of the controls illustrated in Fig. 5 and substituting therefor a timing device. In this circuit power is supplied from supply lines 160 and 161. A low-pressure actuated bellows 162 is connected to the suction side of the refrigeration system and operates a switch 163 in a line 164 leading to a timer motor 165, the other side thereof being connected by line 166 to the opposite supply line. When the pressure of the suction side of the refrigerant system drops below a predetermined limit indicating that the water has been frozen, switch 163 closes to initiate the cycle of operation. Motor 165 drives a first timer cam 167 which immediately releases a switch 168 to make contact between a line 169 leading from supply line 160 around the low-pressure switch 163. Line 169 is thereby connected to a line 170 to energize a holding solenoid 171. The holding solenoid closes a switch 172 controlling a branch 173 of line 164 leading to the timer motor 165. The timer motor is thus energized for a complete revolution of cam 167 regardless of the subsequent action of switch 163. The motor 165 thus operates a cam 175 which at the proper point in the cycle closes a switch 176 connecting line 177 from one side of supply to line 178 leading to the other side of supply and in which the reduction gear motor 55 is located.

Timer motor 165 also operates a cam 180 which closes a switch 181 connecting line 182 leading from one side of supply to line 183 leading to the other side of supply and in which by-pass solenoid 113 is situated. The cam 180 is of considerable extent so that during most of the time the trays are being rotated by motor 55 the by-pass 81 is held open, thus relieving the system from any possibility of high pressures due to blocked passages.

The compressor motor 85 is controlled by a contact beneath switch 168 which is connected through line 190 to a switch 191, the switch being normally in closed position but moved to open position when the tray 140 is filled and moved downward against its supporting springs as previously described. As long as the tray is empty or partially full, the switch 191 will make contact with a line 192 leading back to motor 85, the other side of the supply being connected to motor 85 through line 193. The compressor motor is thus actuated when the timer motor is at rest, unless the tray 140 is filled.

The timer motor 165 also drives a cam 195 which controls a switch 196 connecting line 197 from one side of supply to line 198 leading to the other side of supply and in which the solenoid 107 controlling the flush valve 121 is situated.

The foregoing is illustrative of a form of circuit in which a plurality of motor-driven timer cams is employed as distinguished from the previously described circuit in which other forms of controls are employed. Various modifications in such control circuits will be readily apparent to those skilled in the art.

Having illustrated and described preferred embodiments of the invention, it should be apparent to those skilled in the art that the invention permits of modification in arrangement and detail. I claim as my invention all such modifications as come within the true spirit and scope of the appended claims.

I claim:

1. In a device of the character described, a pair of oppositely facing receptacles, a thermal insulating member between and supporting said receptacles, the opposite faces of said insulating member being hollowed out and spaced from the bottoms of said receptacles to provide a pair of enclosed spaces insulated from each other, a conduit in each of said spaces, a rotatable member fixed to said receptacles and having four equally spaced passages therethrough, each of which communicates with an end of one of said conduits, a stationary member associated with said rotatable member and having four openings therethrough so arranged as to be capable of simultaneous alignment with said passages, and a refrigeration system including a compressor, a discharge line from said compressor leading to one of the openings in said stationary member, a condenser in communication with a second opening in said stationary member, a liquid line leading from said condenser, orifice means connecting said liquid line to a third opening in said stationary member, and a suction line leading from the fourth opening in said stationary member to said compressor.

2. In a device of the character described, a pair of oppositely facing receptacles, a thermal insulating member between and supporting said receptacles, the opposite faces of said member being hollowed out and spaced from the bottoms of said receptacles to provide a pair of enclosed spaces insulated from each other, a refrigerant expander in each of said spaces, a rotatable member fixed to said receptacles and having four equally spaced passages therethrough, each of which communicates with an end of one of said expanders, a stationary member associated with said rotatable member and having four openings therethrough so arranged as to be capable of simultaneous alignment with said passages, and a refrigeration A line 111 leads from line 86 to a plurality of solenoid valve actuators 113, 114 and 115 connected in parallel with the motor 85 so as to be activated when the motor is energized and de-energized when the motor is de-energized. Solenoid valve actuator 113 operates to open the bypass valve 81 when the compressor stops so as to connect the discharge line 71 to the suction line 79 and thus balance pressures on both sides of the compressor; solenoid valve actuator 114 operates to close solenoid valve 73 when the compressor stops; and solenoid valve actuator 115 operates to close solenoid valve 76 when the compressor stops. The valves 73 and 76 isolate the condenser coil and most of the liquid line 75 so that when the compressor stops the main charge of liquid refrigerant will be held in readiness to commence expansion work as soon as the valves are opened.

The flush valve solenoid 107 is connected through a loose connection to the stem 120 of a flush valve float ball 121 controlling the outlet 122 of a water tank 123 which is situated above the receptacles so as to discharge a measured quantity of water thereinto when the solenoid 107 is actuated. The float ball 121 will rise and remain in its upper position until the tank is emptied even though the solenoid 107 should be de-energized before the tank is emptied. As soon as the water in the tank reaches a predetermined low level the suction through the outlet 122 will seat the float ball in the usual manner of such devices. A float valve actuator 124 is provided to open a water inlet valve 125 in the usual manner of such devices so that the tank 123 will be filled to a predetermined level between successive operations of the solenoid 107. Such devices are well known, being represented by the usual flush toilet empting and filling mechanisms, and include adjustment means whereby the amount of water retained and discharged at each operation may be accurately controlled.

As will be seen more clearly in Fig. 2, the cam 106 which operates switch 104 is provided with a pair of diametrically opposed, vertical faces 130 followed by low areas 131 of several degrees extent so that the switch 104 will be held closed for most of a half-revolution of the rotatable member 21 and will suddenly be opened at a desired point so that each operation of the motor 55 will be limited to 180 degrees. The low areas 131 cause the switch 104 to remain open for a few degrees at the start of each movement, and then the switch 104 will be closed. The cam 110 which controls the float valve solenoid is of maximum diameter for most of its extent, being provided with diametrically opposed, vertical faces 132 which are a few degrees ahead of the vertical faces 130 so that the solenoid 107 will be energized shortly before the motor 55 stops. The low areas 133 succeeding the vertical faces 132 are of short duration and so arranged as to open the switch 108 as the motor comes to rest. The two cams are so arranged as to provide the following sequence of operation: Motor 55 drives the rotatable member for most of a semi-revolution, whereupon the switch 108 is closed to open the flush valve shortly before the termination of the semi-revolution, and is then opened as the semi-revolution terminates. The actuation of the flush valve is so close to the end of the semi-revolution that one of the receptacles 41 will be nearly level and will retain the water discharged from the tank.

From the foregoing description of the low areas 131 of cam 106 it will be seen that the switch 104 will be open when motor 55 stops and cannot be mechanically closed until a few degrees of the succeeding semi-revolution has been achieved. The motor 55, therefore, cannot be energized unless provided with current through other means. Such other means comprise the low-pressure switch 95 which is closed when the bellows 96 collapses upon the pressure in suction line 79 reaching such a predetermined low pressure as to indicate that the cubes in the uppermost receptacle have been frozen. The bellows 96 will be held in such collapsed condition until the switch 104 is mechanically closed to complete the semi-revolution of motor 55.

In order to prevent the opening of the low-pressure switch 95 until the mechanical switch 104 has been closed, the refrigeration circuit to the condenser coil 74 is maintained open by the provision of the enlargements 20 in the ends of the discharge passage 15 and condenser inlet passage 16. As soon as the passages 22 in communication with enlargements 20 have passed beyond their confines, the pressure in the discharge line 71 will rise beyond a predetermined limit to expand the high-pressure bellows 91 and open switch 90 so that the compressor motor 85 is arrested. Simultaneously, by-pass solenoid 113 is de-energized to open the by-pass valve 81 so that the pressure in discharge line 71 is released and balances the pressure in suction line 79. This assures the expansion of the low-pressure bellows 96 so as to place control of the motor 55 entirely under the mechanical switch 104. The drop in pressure may close the high-pressure switch 90 but the motor 85 cannot continue in operation for long since the discharge passage 15 is blocked and the compressor will immediately stop. Whenever the by-pass valve 81 is open the isolating valves 73 and 76 are closed to retain the liquid refrigerant in the condenser coil 74.

When the rotatable member has made a quarter of a revolution, the coils 63 will be momentarily in communication with passages through the trunnion 12. The coil associated with the upper receptacle will be in communication with passages 15 and 18, and the coil associated with the lower receptacle will be in communication with passages 16 and 17. The coil communicating with passages 16 and 17 is filled with hot, high-pressure gas so none can enter from the condenser inlet line 72 except to the slight extent required to charge the short tube 78. At the same instant, the coil associated with the upper receptacle will be connected across the compressor discharge line 71 and the compressor suction line 79, the pressures therein having been previously balanced by the opening of the by-pass valve 81 so that no effect on the system will occur by reason of this positioning of the upper coil. Rotation will now continue until the semi-revolution is completed.

When the semi-revolution is completed the upper coil will operate as an expansion coil and will commence the work of freezing water which has been discharged into the upper receptacle. The lower coil now provides a passageway from the compressor to the condenser so that the hot compressed gas soon melts the cubes loose from the lower receptacle, whereupon they fall into a removable receptacle 140 or other means for conveying ice cubes away from the machine. The receptacle 140 is preferably mounted upon springs so that when filled to a certain capacity it will open a main switch 145 in power line 88 so as to prevent further operation of the system. If a receptacle is used it should be of sufficient capacity to hold ice cubes produced during a number of successive operations of the freezing unit.

Any suitable condenser may be employed, but I prefer a counter-flow, water cooled condenser comprising a shell 141 in which the coil 74 is located, the shell being provided with cold water through an inlet 142 at the bottom where the cool liquid refrigerant is located in the coil, and an upper outlet 143, thereby taking advantage of the counter-flow principle of refrigerant condensing. Suitable means, as is well known in the art, may be employed to control the water supply to the condenser.

A modification of the freezing receptacle is illustrated in Figs. 9 and 10, the modification having for its purpose the provision of a greater area of metal comprising the bottom of the water-holding compartments in contact with the refrigerant gas. In this modification a modified form of insulating block 150 is provided with cavities in which the freezing trays 151 are located, the freezing trays being provided with partitions 152 and central projections 153 as previously described. The bottom of the tray 151 forms the upper wall of a plate expander, so that the entire area thereof is in contact with the refrigerant gas. The plate expander is provided with a sinuous passageway by means of partitions 154 extending from alternate ends thereof as is usual in such devices. A pair of short, tubular connectors 155 provide the inlet and outlet to the plate expander, the same projecting through open slots 156 in the end of the rim of the block 150 and being connected to the passageways through the rotatable member 21.

A modified form of control circuit is illustrated in Fig. 11, this control circuit eliminating some of the controls illustrated in Fig. 5 and substituting therefor a timing device. In this circuit power is supplied from supply lines 160 and 161. A low-pressure actuated bellows 162 is connected to the suction side of the refrigeration system and operates a switch 163 in a line 164 leading to a timer motor 165, the other side thereof being connected by line 166 to the opposite supply line. When the pressure of the suction side of the refrigerant system drops below a predetermined limit indicating that the water has been frozen, switch 163 closes to initiate the cycle of operation. Motor 165 drives a first timer cam 167 which immediately releases a switch 168 to make contact between a line 169 leading from supply line 160 around the low-pressure switch 163. Line 169 is thereby connected to a line 170 to energize a holding solenoid 171. The holding solenoid closes a switch 172 controlling a branch 173 of line 164 leading to the timer motor 165. The timer motor is thus energized for a complete revolution of cam 167 regardless of the subsequent action of switch 163. The motor 165 thus operates a cam 175 which at the proper point in the cycle closes a switch 176 connecting line 177 from one side of supply to line 178 leading to the other side of supply and in which the reduction gear motor 55 is located.

Timer motor 165 also operates a cam 180 which closes a switch 181 connecting line 182 leading from one side of supply to line 183 leading to the other side of supply and in which by-pass solenoid 113 is situated. The cam 180 is of considerable extent so that during most of the time the trays are being rotated by motor 55 the by-pass 81 is held open, thus relieving the system from any possibility of high pressures due to blocked passages.

The compressor motor 85 is controlled by a contact beneath switch 168 which is connected through line 190 to a switch 191, the switch being normally in closed position but moved to open position when the tray 140 is filled and moved downward against its supporting springs as previously described. As long as the tray is empty or partially full, the switch 191 will make contact with a line 192 leading back to motor 85, the other side of the supply being connected to motor 85 through line 193. The compressor motor is thus actuated when the timer motor is at rest, unless the tray 140 is filled.

The timer motor 165 also drives a cam 195 which controls a switch 196 connecting line 197 from one side of supply to line 198 leading to the other side of supply and in which the solenoid 107 controlling the flush valve 121 is situated.

The foregoing is illustrative of a form of circuit in which a plurality of motor-driven timer cams is employed as distinguished from the previously described circuit in which other forms of controls are employed. Various modifications in such control circuits will be readily apparent to those skilled in the art.

Having illustrated and described preferred embodiments of the invention, it should be apparent to those skilled in the art that the invention permits of modification in arrangement and detail. I claim as my invention all such modifications as come within the true spirit and scope of the appended claims.

I claim:

1. In a device of the character described, a pair of oppositely facing receptacles, a thermal insulating member between and supporting said receptacles, the opposite faces of said insulating member being hollowed out and spaced from the bottoms of said receptacles to provide a pair of enclosed spaces insulated from each other, a conduit in each of said spaces, a rotatable member fixed to said receptacles and having four equally spaced passages therethrough, each of which communicates with an end of one of said conduits, a stationary member associated with said rotatable member and having four openings therethrough so arranged as to be capable of simultaneous alignment with said passages, and a refrigeration system including a compressor, a discharge line from said compressor leading to one of the openings in said stationary member, a condenser in communication with a second opening in said stationary member, a liquid line leading from said condenser, orifice means connecting said liquid line to a third opening in said stationary member, and a suction line leading from the fourth opening in said stationary member to said compressor.

2. In a device of the character described, a pair of oppositely facing receptacles, a thermal insulating member between and supporting said receptacles, the opposite faces of said member being hollowed out and spaced from the bottoms of said receptacles to provide a pair of enclosed spaces insulated from each other, a refrigerant expander in each of said spaces, a rotatable member fixed to said receptacles and having four equally spaced passages therethrough, each of which communicates with an end of one of said expanders, a stationary member associated with said rotatable member and having four openings therethrough so arranged as to be capable of simultaneous alignment with said passages, and a refrigeration system including a compressor, a discharge line from said compressor leading to one of the openings in said stationary member, a condenser in communication with a second opening in said stationary member, a liquid line leading from said condenser, orifice means connecting said liquid line to a third opening in said stationary member, and a suction line leading from the fourth opening in said stationary member to said compressor, said first and second openings in said stationary member being horizontally opposite each other at one level and said third and fourth openings in said stationary member being horizontally opposite each other at a higher level.

3. In a device of the character described, a pair of oppositely facing receptacles, a refrigerant expander underlying each of said receptacles, a thermal insulating member between said expanders, a rotatable member fixed to said receptacles and having four passages therethrough, each of which communicates with an end of one of said expanders, a stationary member associated with said rotatable member and having four openings therethrough so arranged as to be capable of simultaneous alignment with said passages, and a refrigeration system including a compressor, a discharge line from said compressor leading to one of the openings in said stationary member, a condenser in communication with a second opening in said stationary member, a liquid line leading from said condenser to a third opening in said stationary member, and a suction line leading from the fourth opening in said stationary member to said compressor, a motor operatively connected to said rotatable member, and means responsive to low pressure in said suction line to initiate operation of said motor.

4. In a device of the character described, a pair of oppositely facing receptacles, a refrigerant expander underlying each of said receptacles, a thermal insulating member between said expanders, a rotatable member fixed to said receptacles and having four passages therethrough, each of which communicates with an end of one of said expanders, a stationary member associated with said rotatable member and having four openings therethrough so arranged as to be capable of simultaneous alignment with said passages, and a refrigeration system including a compressor, a discharge line from said compressor leading to one of the openings in said stationary member, a condenser in comunication with a second opening in said stationary member, a liquid line leading from said condenser to a third opening in said stationary member, and a suction line leading from the fourth opening in said stationary member to said compressor, a motor operatively connected to said rotatable member, means responsive to low pressure in said suction line to initiate operation of said motor, and means to arrest said motor when said rotatable member has rotated 180 degrees.

5. In a device of the character described, a rotatable member having oppositely directed surfaces, freezing receptacles mounted on said surfaces and facing outwardly therefrom, a compressor-condenser-expander refrigeration system associated with said member, valve means associated with said member, said valve means being arranged to direct hot gas in thermal exchange with one of said receptacles when facing downwardly and refrigerating gas in thermal exchange with the other of said receptacles when facing upwardly, motor means for intermittently rotating said member through 180 degrees, and means responsive to the pressure of the refrigerant returning from thermal exchange with said upper receptacle for initiating action of said motor means.

6. In a device of the character described, a member rotatable about a horizontal axis and having oppositely directed surfaces, freezing receptacles mounted on said surfaces and facing outwardly therefrom, a compressor-condenser-expander refrigeration system associated with said member, valve means associated with said member, said valve means being arranged to direct hot gas in thermal exchange with one of said receptacles when facing downwardly and refrigerating gas in thermal exchange with the other of said receptacles when facing upwardly, motor means for rotating said member, means responsive to the pressure of the refrigerant returning from thermal exchange with said upper receptacle for initiating action of said motor means, a resiliently mounted tray arranged to receive frozen material from said lower receptacle when melted loose therefrom by the hot gas in thermal exchange therewith, and a switch in circuit with said motor adapted to be opened by said tray when the contents of said tray exceed a maximum weight.

7. In a device of the character described, a stationary trunnion, a compressor-condenser-expander refrigerating system, four passages through said trunnion, two arranged on a level with each other at a low level and two arranged on a level with each other at a high level, said two low-level passages being included in said refrigerating system at a point such that hot gas may flow therethrough and said two high-level passages being included in said refrigerating system at a point such that low-temperature refrigerating gas may flow therethrough.

8. In a device of the character described, a stationary trunnion, a compressor-condenser-expander refrigerating system, four passages through said trunnion, two arranged on a level with each other at a low level and two arranged on a level with each other at a high level, said two low-level passages being included in said refrigerating system at a point such that hot gas may flow therethrough and said two high-level passages being included in said refrigerating system at a point such that low-temperature refrigerating gas may flow therethrough, a rotatable member associated with said trunnion and having four passages therethrough adapted to be placed successively in communication with pairs of said trunnion passages when said rotatable member is rotated, a first enclosed passageway in communication with one pair of passages through said rotatable member, a second enclosed passageway in communication with the other pair of passages through said rotatable member, and a pair of liquid-holding receptacles on said rotatable member, each in thermal-exchange relationship with one of said enclosed passageways.

9. A liquid-freezing device comprising a compressor-condenser-expander refrigerating system, a rotatable member, a pair of oppositely facing, liquid-holding receptacles mounted on said member, means in said refrigerating system to direct hot gas in thermal exchange with one of said receptacles when facing downwardly and expanding gas in thermal exchange with the other of said receptacles when facing upwardly, means to rotate said rotatable member intermittently when the pressure of the refrigerant returning to said compressor passes below a predetermined point, and means to arrest rotation of said rotatable member when said receptacles are horizontally disposed.

10. A liquid-freezing device comprising a compressor-condenser-expander refrigerating system, a rotatable member, a pair of oppositely facing, liquid-holding receptacles mounted on said member, means is said refrigerating system to direct hot gas in thermal exchange with one of said receptacles when facing downwardly and expanding gas in thermal exchange with the other of said receptacles when facing upwardly, means to rotate said rotatable member 180 degrees at each movement, means to arrest rotation of said rotatable member when said receptacles are horizontally disposed, liquid supply means, and means responsive to rotation of said member for discharging a predetermined amount of liquid into the upper receptacle at the termination of each movement.

11. In a freezing apparatus, the combination comprising a unit defining a pair of relatively flat, open, liquid receptacles arranged with their bottoms parallel to each other and their open sides facing in opposite directions, thermal insulating means separating the bottoms of said receptacles, means supporting said unit for rotative movement about a horizontal axis, actuating means operatively connected to said unit for periodically rotating said unit through an angle of 180° to alternately position said receptacles in the upwardly facing position, means defining separate fluid passages in thermal exchange relation with the bottoms of each of said receptacles, and means connected to said unit for supplying a freezing fluid to the passage associated with the upwardly facing one of said receptacles while simultaneously supplying a heated fluid to the passage associated with the downwardly facing one of said receptacles.

12. In a freezing apparatus, the combination comprising a unit defining a pair of relatively flat, open, liquid receptacles arranged with their bottoms parallel to each other and their open sides facing oppositely, thermal insulating means separating the bottoms of said receptacles, means defining separate fluid passages in thermal exchange relation with the bottoms of each of said receptacles, means supporting said unit for rotative movement about a horizontal axis, actuating means operatively connected to said unit for periodically rotating said unit through an angle of 180° and alternately positioning said receptacles in the upwardly facing position, mechanical refrigeration apparatus providing sources of freezing fluid and heating fluid, conduit means connecting the source of freezing fluid to the passage associated with the upwardly facing one of said receptacles, conduit means connecting the source of heating fluid to the passage associated with the downwardly facing one of said receptacles, and valve means in both of said conduit means for alternating the connections of said sources to said passages upon each semi-revolution of said unit.

13. In a liquid freezing apparatus including a compressor-condenser refrigerating system providing a source of freezing fluid and a source of heating fluid, the combination comprising a freezer unit, trunnions on the opposite ends of said unit for supporting said unit for rotation about a horizontal axis, said unit including a pair of relatively flat, liquid receiving trays arranged on opposite sides of said axis and substantially symmetrically with respect thereto, the bottoms of said trays being spaced apart in parallel relation with respect to each other and thermally insulated from each other, the open sides of said trays facing in opposite directions, said unit including means defining a pair of separate fluid passages, one of said pair of passage defining means being arranged in thermal exchange relation with each of said pair of trays, motor means operatively connected to said unit for effecting rotation thereof about said axis, control means for controlling the energization of said motor for effecting periodic rotation of said unit about said axis through an angle of 180° to alternately position said trays in the upwardly facing position, conduit means connecting the source of freezing fluid with the passage associated with the upwardly facing one of said trays, and conduit means connecting the source of heating fluid with the passage associated with the downwardly facing one of said trays, and reversing valve means arranged in both of said last mentioned conduit connections for reversing the connections of said sources to said trays upon rotation of said unit by said motor means.

14. In a liquid freezing apparatus including a compressor-condenser refrigerating system providing a source of freezing fluid and a source of heating fluid, the combination comprising a freezer unit, trunnions on the opposite ends of said unit for supporting said unit for rotation about a horizontal axis, said unit including a pair of relatively flat, liquid receiving trays arranged on opposite sides of said axis and substantially symmetrically with respect thereto, the bottoms of said trays being spaced apart in parallel relation with respect to each other and thermally insulated from each other, the open sides of said trays facing in opposite directions, said unit including means defining a pair of separate fluid passages, one of said pair of passage defining means being arranged in thermal exchange relation with each of said pair of trays, motor means operatively connected to said unit for effecting rotation thereof about said axis, control means for controlling the energization of said motor for effecting periodic rotation of said unit about said axis through an angle of 180° to alternately position said trays in the upwardly facing position, conduit means connecting said source of freezing fluid through one of said trunnions to the passage associated with the upwardly facing one of said trays, conduit means connecting the source of said heating fluid through one of said trunnions to the passage associated with the downwardly facing one of said trays, and means associated with said trunnions for automatically changing the connections of said sources of said trays upon rotation of said unit.

15. In a freezing apparatus, the combination comprising a unit defining a pair of relatively flat, liquid receiving trays, trunnions on the opposite ends of said unit for supporting said unit for rotation about a horizontal axis, said trays being symmetrically arranged on opposite sides of said axis and with the bottoms of said trays arranged in parallel spaced apart relation and thermally insulated from each other, the open sides of said trays facing in opposite directions, means defining separate refrigerant passages in thermal exchange relation with the bottom of each of said trays, a motor means operatively connected to said unit for effecting rotation thereof, control means for effecting periodic energization of said motor for alternately positioning first one and then the other of said trays in the upwardly facing position, a source of freezing fluid, conduit means connecting said source to the passage associated with the upwardly facing one of said pair of trays, and valve means in said last mentioned conduit means for selectively connecting said source to the passage associated with the upwardly facing tray simultaneously with rotation of said unit.

16. In a freezing apparatus, the combination comprising a unit defining a pair of relatively flat, liquid receiving trays, trunnions on the opposite ends of said unit for supporting said unit for rotation about a horizontal axis, said trays being symmetrically arranged on opposite sides of said axis and with the bottoms of said trays arranged in parallel spaced apart relation and thermally insulated from each other, the open sides of said trays facing in opposite directions, means defining refrigerant passages in thermal exchange relation with the bottom of each of said trays, a motor means operatively connected to said unit for effecting rotation thereof, means for controlling the energization of said motor for effecting periodic energization thereof for alternately positioning first one and then the other of said trays in the upwardly facing position, a source of freezing fluid, and conduit means connecting said source to the passage associated with the upwardly facing one of said pair of trays, valve means in said last mentioned conduit means for alternately connecting said source to said trays simultaneously with rotation of said unit, a source of heat, and means for effectively connecting said last mentioned source to the downwardly facing one of said trays simultaneously with the rotation of said unit.

IRVING T. ERICKSON.

REFERENCES CITED

The following references are of record in the file of this patent:

UNITED STATES PATENTS

| Number | Name | Date |
|---|---|---|
| 2,403,275 | Gilliam | July 2, 1946 |
| 2,407,058 | Clum | Sept. 3, 1946 |
| 2,493,900 | Schaberg et al. | Jan. 10, 1950 |